US012612104B2

(12) United States Patent
Ishida et al.

(10) Patent No.: US 12,612,104 B2
(45) Date of Patent: Apr. 28, 2026

(54) STEERING WHEEL DEVICE FOR VEHICLE

(71) Applicant: Autoliv Development AB, Vargarda (SE)

(72) Inventors: Ryotaro Ishida, Kanagawa (JP); Sumit Kumar, Kanagawa (JP); Keisuke Honma, Kanagawa (JP); Kazuhiro Abe, Kanagawa (JP); Hiroyoshi Shimono, Kanagawa (JP)

(73) Assignee: Autoliv Development AB, Vårgårda (SE)

( * ) Notice: Subject to any disclaimer, the term of this patent is extended or adjusted under 35 U.S.C. 154(b) by 548 days.

(21) Appl. No.: 17/758,914

(22) PCT Filed: Dec. 21, 2020

(86) PCT No.: PCT/JP2020/047624
§ 371 (c)(1),
(2) Date: Jan. 6, 2023

(87) PCT Pub. No.: WO2021/145150
PCT Pub. Date: Jul. 22, 2021

(65) Prior Publication Data
US 2023/0174152 A1 Jun. 8, 2023

(30) Foreign Application Priority Data
Jan. 16, 2020 (JP) ................................. 2020-005080

(51) Int. Cl.
*B62D 7/22* (2006.01)
*B60R 21/203* (2006.01)
*F16F 15/08* (2006.01)

(52) U.S. Cl.
CPC .......... *B62D 7/222* (2013.01); *B60R 21/2037* (2013.01); *F16F 15/08* (2013.01)

(58) Field of Classification Search
CPC ....... B62D 7/222; B60R 21/2037; F16F 15/08
See application file for complete search history.

(56) References Cited

U.S. PATENT DOCUMENTS 6,508,485 B2 * 1/2003 Kikuta ................... B60Q 5/003
200/61.54
6,600,114 B2 * 7/2003 Kikuta ................... B60Q 5/003
200/61.54
(Continued)

FOREIGN PATENT DOCUMENTS

CN 103029741 A 4/2013
CN 107428357 A 12/2017
(Continued)

OTHER PUBLICATIONS

WO-2019142654-A1 (machine translation) (Year: 2019).*
(Continued)

*Primary Examiner* — Jason D Shanske
*Assistant Examiner* — Joselynn Y Sliteris
(74) *Attorney, Agent, or Firm* — Matthew D. Thayne; Thayne and Davis LLC

(57) ABSTRACT

A vehicle steering wheel device enabling miniaturizing an airbag module and also a miniaturized horn pad portion while ensuring a damping effect comparable to a conventional damping effect. Each damper has a straight pin, a grip provided at a first end is engaged to a central cored bar through rotate operation around the pin axis, and a connecting tip end part that connects to the module housing is provided at the other end. A plurality of insertion holes through which the connecting tip end part is inserted are arranged in the module housing surrounding the outer edge of the inflator, and the connecting tip end part is formed with a constricted portion having an outer diameter smaller than the diameter of the insertion hole, and the connecting tip end (Continued)

part is connected to the module housing via a set spring supported by the module housing to engage the constriction.

12 Claims, 9 Drawing Sheets

(56) References Cited

U.S. PATENT DOCUMENTS

| | | | | |
|---|---|---|---|---|
| 8,286,766 | B2 * | 10/2012 | Terada | B62D 7/222 |
| | | | | 200/61.55 |
| 9,195,257 | B2 * | 11/2015 | Miyahara | G05G 1/10 |
| 9,403,552 | B2 * | 8/2016 | Onohara | B62D 1/046 |
| 9,550,525 | B2 * | 1/2017 | Ishii | B60R 21/21658 |
| 9,731,747 | B2 * | 8/2017 | Obayashi | B60R 21/2037 |
| 10,315,605 | B2 * | 6/2019 | Ishii | B60R 21/2037 |
| 10,351,089 | B2 * | 7/2019 | Shii | B60R 21/2037 |
| 10,875,564 | B2 * | 12/2020 | Minami | B62D 7/222 |
| 10,899,302 | B2 * | 1/2021 | Ishii | B60R 21/217 |
| 10,913,420 | B2 * | 2/2021 | Ishii | B60R 21/2037 |
| 11,180,178 | B2 * | 11/2021 | Kiyohara | B62D 1/11 |
| 11,267,423 | B2 * | 3/2022 | Ko | B60R 21/2037 |
| 11,305,716 | B2 * | 4/2022 | Hirota | B60R 21/21656 |
| 11,351,915 | B2 * | 6/2022 | Matsuo | B60Q 5/003 |
| 11,511,665 | B2 * | 11/2022 | Bertrand | B60Q 5/003 |
| 11,511,695 | B2 * | 11/2022 | Hayakawa | B60R 21/203 |
| 2002/0043786 | A1 | 4/2002 | Schutz | |
| 2008/0136073 | A1 | 6/2008 | Kreuzer | |

FOREIGN PATENT DOCUMENTS

| | | | |
|---|---|---|---|
| CN | 110431050 | A | 11/2019 |
| JP | 2009-202859 | A | 9/2009 |
| JP | 2013-028223 | A | 2/2013 |
| JP | 2015-71402 | A | 4/2015 |
| JP | 2017-218033 | A | 12/2017 |
| JP | 2018-176898 | A | 11/2018 |
| JP | 2019-508316 | A | 3/2019 |
| WO | 2017154571 | A1 | 9/2017 |
| WO | WO-2019142654 | A1 * | 7/2019 ........... B60R 21/203 |
| WO | 2019208085 | A1 | 10/2019 |

OTHER PUBLICATIONS

WO2017154571A1—Machine Translation (11 pgs).
WO2019208085A1—Machine Translation (10 pgs).
CN110431050A—Machine Translation (10 pgs).
CN107428357A—Machine Translation (10 pgs).
CN103029741A—Machine Translation (18 pgs).

* cited by examiner

STEERING WHEEL DEVICE FOR VEHICLE

TECHNICAL FIELD

The present invention relates to a vehicle steering wheel device capable of ensuring a damping effect that is comparable to that in the related art, downsizing an airbag module, and also reducing the size of the horn pad portion.

BACKGROUND TECHNOLOGY

Conventionally, patent Document 1 is known in relation to a technique that incorporates a damper for damping vibration of a steering wheel between the steering wheel and an airbag module serving as a damper mass.

In the "steering wheel device" of Patent Document 1, the steering wheel is provided with a boss region, an airbag module installed in the boss region that also functions as a horn switch, a plurality of holes provided on the rear surface of the housing of the airbag module, a damper that joins the inner edge of the holes on the inner side, and rod shaped pins inserted into each of the holes with a first end that is joined with the damper installed in the holes and a second end that is connected to the boss region. Due to an elastic force, the damper between the boss region and the airbag module absorbs the vibration transmitted from the steering shaft when the vehicle is driving, and further, is designed to push back the airbag module after being released by the occupant during horn operation to an initial state of before being pushed by the occupant.

Three dampers are provided, two being provided toward both sides in the left-right direction of the airbag module installed in the boss region based on a neutral position of the steering wheel with a steering angle of zero, and one being provided toward the lower side in the middle in the left-right direction of the airbag module, such that the three dampers appear to be at each corner of an inverted isosceles triangle.

PRIOR ART DOCUMENTS

Patent Documents

Patent Document 1: Japanese Unexamined Patent Publication No. 2015-71402

SUMMARY OF THE INVENTION

Problem to be Solved by the Invention

Since a damper in unit form has a cylindrical portion having a large external dimension, the size of each damper is large. Therefore, a large space was required to install three dampers.

For this reason, there was a problem that the external dimensions of the airbag module in which the damper is installed became large, and as a result, the horn pad portion that influences the design of the steering wheel also became large.

In light of the problems described above, an object of the present invention is to provide a vehicle steering wheel device that can ensure a damping effect that compares favorably to a conventional device, while enabling miniaturizing of the airbag module and of the horn pad portion.

Means for Solving the Problems

The vehicle steering wheel device according to the present invention is a vehicle steering wheel device provided with a plurality of dampers that absorb the vibrations of the steering wheel around a boss part of the steering wheel in between a central cored bar of the steering wheel and a module housing of an airbag module which is the damper mass, wherein:

each of the dampers has a straight pin, a grip provided on a first end thereof is engaged to the central cored bar through rotate operation around the axis of the pin, securing the damper, and a connecting tip end part provided on a second end connects to the module housing; the module housing is provided with an inflator facing the central cored bar; the module housing is provided with a plurality of insertion holes for inserting each of the connecting tip end parts arranged encircling the outer edge of the inflator; the connecting tip end part is formed with a constricted portion that has a smaller outer diameter than the hole diameter of the insertion hole; and the connecting tip end part is connected with the module housing via a set spring supported by the module housing such that the connecting tip end part engages with the constricted portion.

It is desirable that the plurality of insertion holes are arranged so as to be close to the outer edge of the inflator.

Dampers are preferably disposed on both sides in the left-right direction of the boss portion, with reference to the neutral position of the steering wheel having a zero steering angle, and are preferably provided with an engagement mechanism in parallel with the damper that allows relative displacement between the central cored bar and the module housing.

The central cored bar is preferably formed at least thinner than regions other than the region surrounding the engaged region where the damper grip is engaged, and is preferably formed with a damper installation recess.

The pin is preferably provided with a cover part that prevents contact with the set spring. The set spring is preferably provided with a cover part that prevents contact with the pin.

The damper includes:

a pin that has a connecting tip end part and a base plate part on both ends, a circular insulator encircling the pin and superimposed on the base plate part, a circular rubber encircling the pin and superimposed on the circular insulator, a cylindrical insulator having a first spring seat superimposed on the rubber provided encircling the pin, a collar having a second spring seat, formed in a circle encircling the pin, and provided freely slidable in the axial direction of the pin on the connecting tip end part side and enabling contact with the module housing, a horn spring provided encircling the pin between the first and second spring seats, and that elastically supports the module housing via the collar, a holder formed in a cylindrical shape encircling the rubber, provided on the base plate part side of the pin, which retains the rubber on the pin, and a grip provided on the holder, and the damper is preferably a unit part integrally assembled from the pin to the grip.

The grip is preferably integrally formed in the holder.

The holder preferably includes a cover facing the base plate part of the pin, and the cover is formed with a convex portion that abuts the base plate part and that enables the pin to oscillate.

A vibration insulating member is preferably provided between the base plate part and the holder.

A horn plate is provided on the module housing side elastically supported by the horn spring, and a horn contact is provided on the central cored bar side in contact with the horn plate to sound the horn.

The cylindrical insulator is preferably in contact with the pin or in line contact with the pin in the axial direction.

The circular insulator is preferably in close contact with the rubber. The set spring is preferably supported on the module housing so as to traverse the insertion hole. The set spring is preferably formed using a rod-shaped metal member.

Effect of the Invention

The vehicle steering wheel device according to the present invention enables ensuring a damping effect comparable to that in the related art, and reducing the size of the airbag module and reducing the size of the horn pad portion.

BRIEF DESCRIPTION OF THE DRAWINGS

FIG. 6 is an explanatory diagram describing the steps of connecting the connecting tip end part of the damper as illustrated in FIG. 3 to the module housing using the set spring.

MODE FOR CARRYING OUT THE INVENTION

Figure 1:
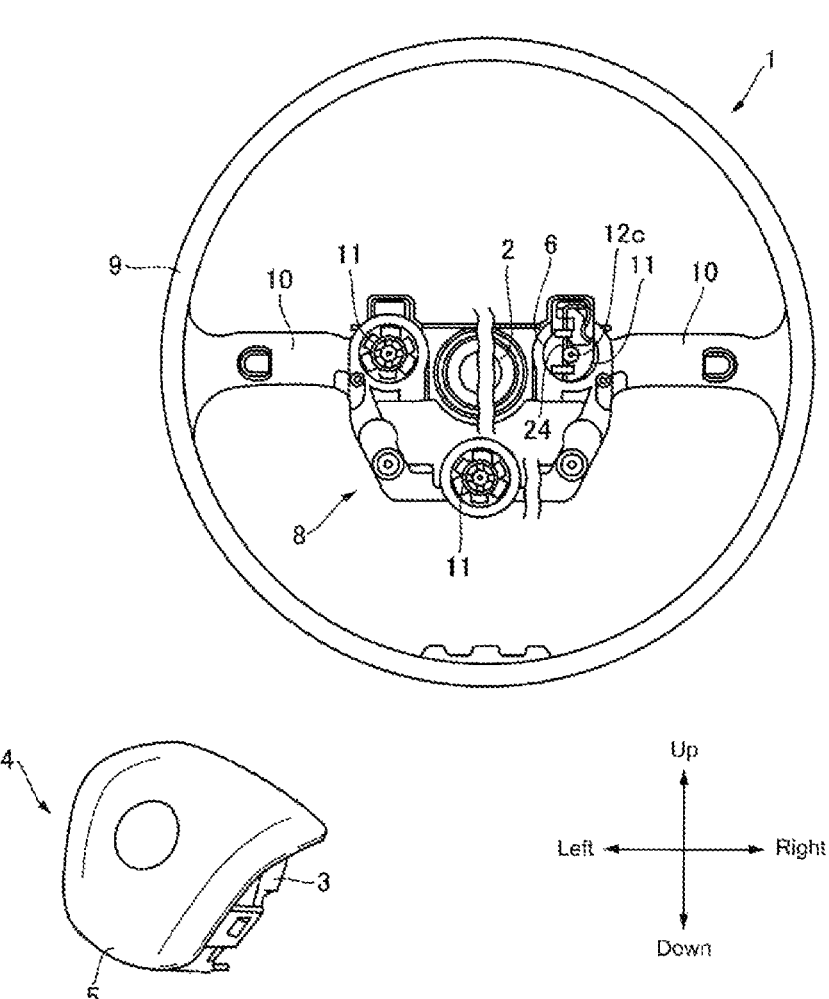
FIG. 1 is an explanatory diagram illustrating a preferred Embodiment of a vehicle steering wheel device according to the present invention, partially breaking apart a steering wheel to which a horn pad portion is attached where a horn cover covers the airbag module.
Figure 2:
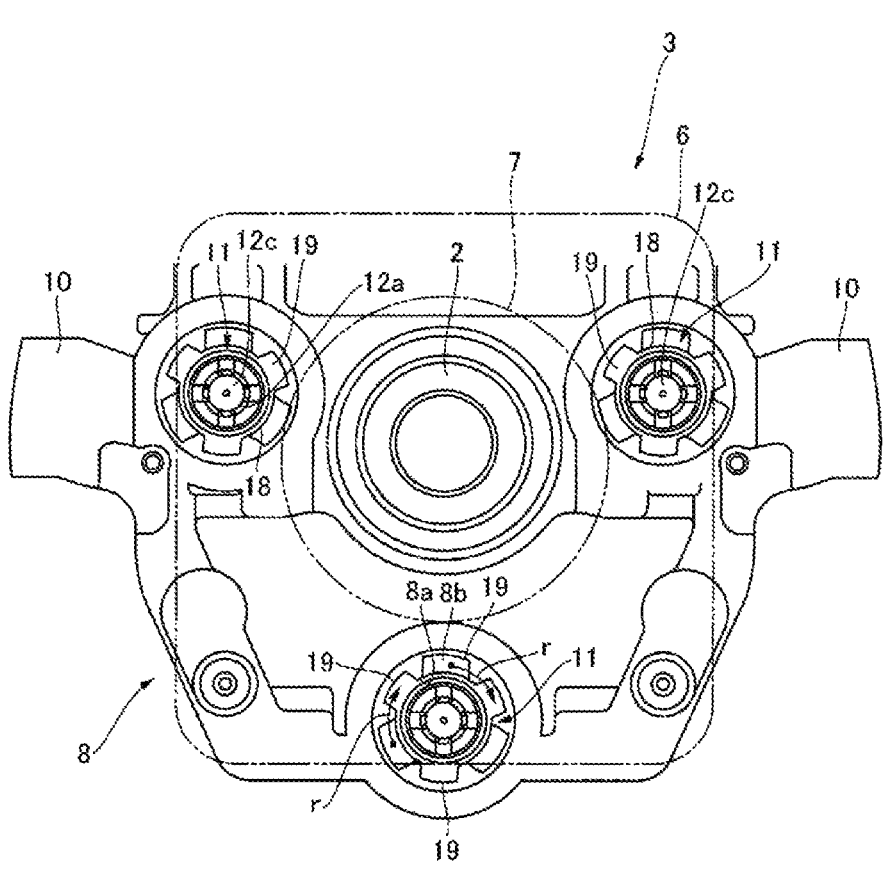
FIG. 2 is an enlarged view of the main parts of the steering wheel as illustrated in FIG. 1.
Figure 2:
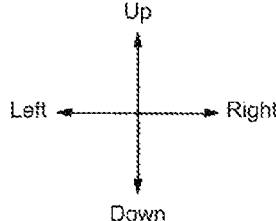

A suitable Embodiment of the vehicle steering wheel device according to the present invention will be described in detail below with reference to the accompanying drawings. FIG. 1 is an explanatory diagram of a vehicle steering wheel device according to the present Embodiment illustrating a partially broken steering wheel. A horn pad portion covering the airbag module with a horn cover is attached to the steering wheel. FIG. 2 is an enlarged view of the main parts of the steering wheel as illustrated in FIG. 1.

In these drawings, the steering wheel indicates each direction on the upper and lower left and right with respect to the neutral position at a zero steering angle. Otherwise, the side viewed from the driver's side shall be described as the front side and the opposite side as the back side.

The steering wheel 1 is installed in the driver seat of the vehicle. The boss portion 2 of the steering wheel 1 is connected to a steering shaft passing through the interior of a steering column (not shown). The steering wheel 1 transmits the operating force of the driver to the steering gear and the like.

An airbag module 3, which functions as a driver airbag in an emergency, is mounted in the center of the steering wheel 1. Although this will be described below, the airbag module 3 also functions as a horn switch under normal operation that a driver pushes to cause the horn to sound.

As illustrated in FIG. 1, the driver side of a horn pad portion 4 is covered with a resin horn cover 5 that functions as a design surface. The airbag module 3 is provided on the back side of the horn cover 5.

Figure 9:
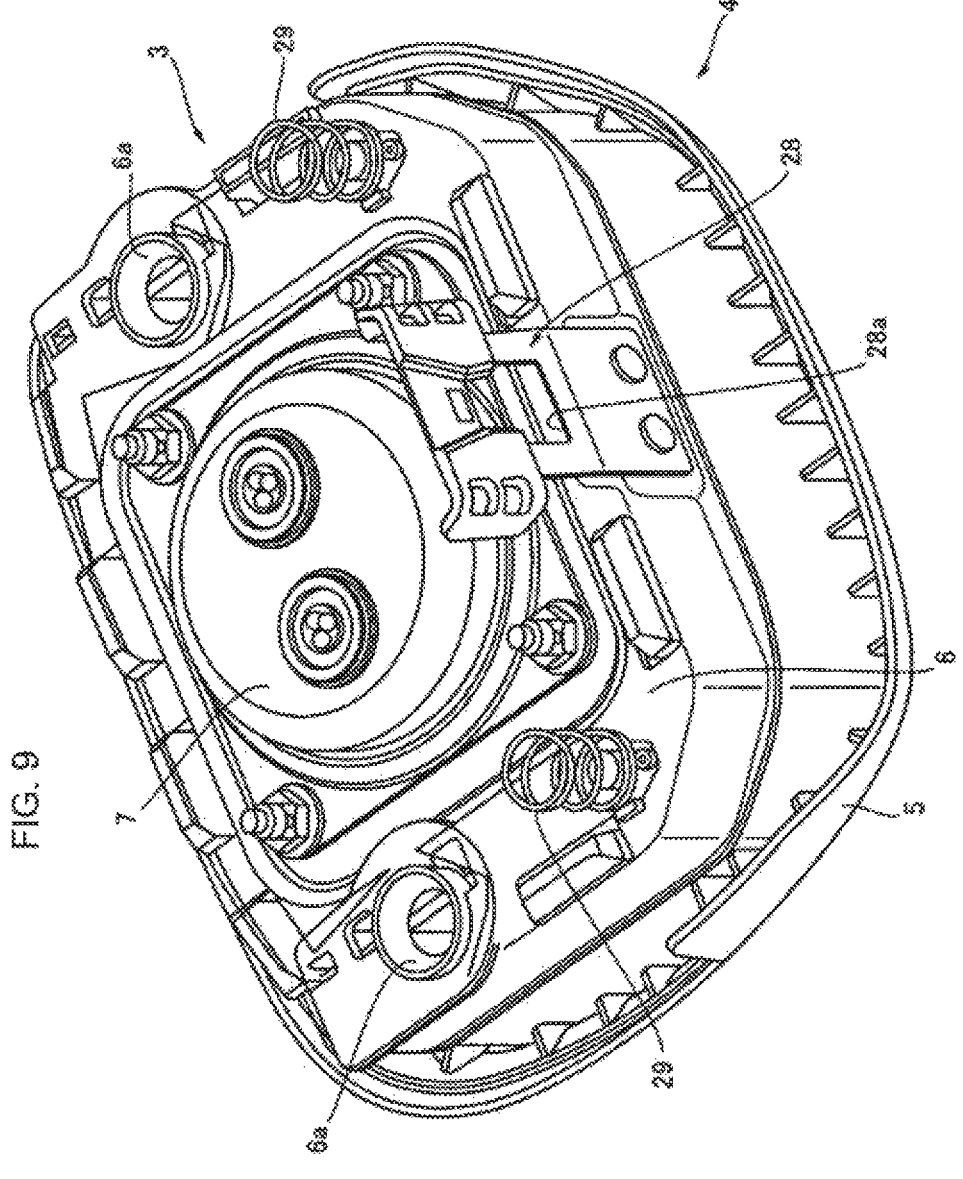
FIG. 9 is a perspective view of the airbag module attached to the steering wheel as illustrated in FIG. 8 as viewed from the back side.

The airbag module 3 is configured by stowing a folded airbag cushion and an inflator 7 that supplies inflator gas to the airbag cushion inside a box-shaped metal module housing 6 (see FIG. 9 for a state in which the inflator 7 is attached to the module housing 6).

When a signal is sent from a vehicle sensor in an emergency, inflation gas is supplied from the inflator 7 to the airbag cushion. The airbag cushion to which the inflation gas is supplied ruptures the horn cover 5 and expands and deploys into the vehicle interior space to restrain and protect the driver.

In general, the steering wheel 1 includes a central cored bar 8 on which the boss portion 2 is formed, a circular rim portion 9 gripped by the driver, and a spoke portion 10 connecting the central cored bar 8 and the rim portion 9.

In the vehicle steering wheel device according to the present Embodiment, a damper 11 is provided between the steering wheel 1 and the airbag module 3. The damper 11 attenuates the vibration transmitted from the steering shaft to the steering wheel 1.

The airbag module 3 serves as a damper mass of the damper 11 with respect to the steering wheel 1 side. The damper 11 is provided between the central cored bar 8 of the steering wheel 1 and the module housing 6 of the airbag module 3.

A plurality of dampers 11 are arranged around the boss portion 2 of the steering wheel 1. In the illustrated example, three dampers 11 are arranged at appropriate intervals from each other.

Specifically, the dampers 11 are provided with reference to the neutral position of the steering wheel 1 with a zero steering angle. For example, one damper 11 is arranged on each side of the boss portion 2 in the left-right direction (on the sides of the left and right spoke portions 10), and one damper 11 is provided on the lower side of the boss portion 2 in the center of the steering wheel 1 in the left-right direction.

The module housing 6 is provided with an inflator 7 facing the central cored bar 8 of the steering wheel 1 in which the damper 11 is arranged.

Figure 3:
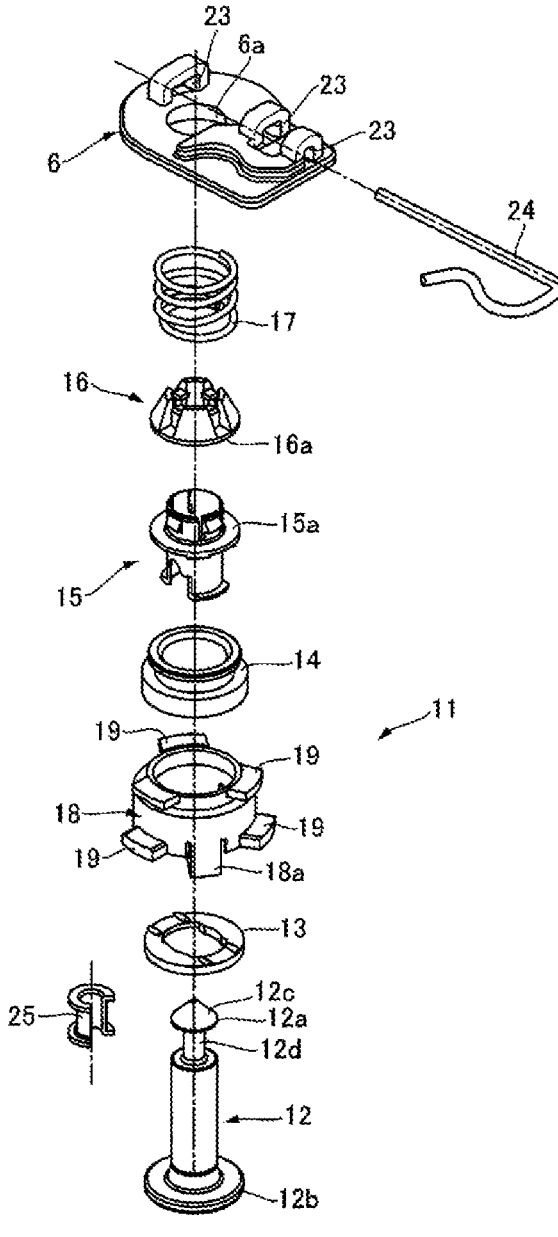
FIG. 3 is an exploded assembly view of the damper provided on the vehicle steering wheel device as illustrated in FIG. 1.
Figure 4:
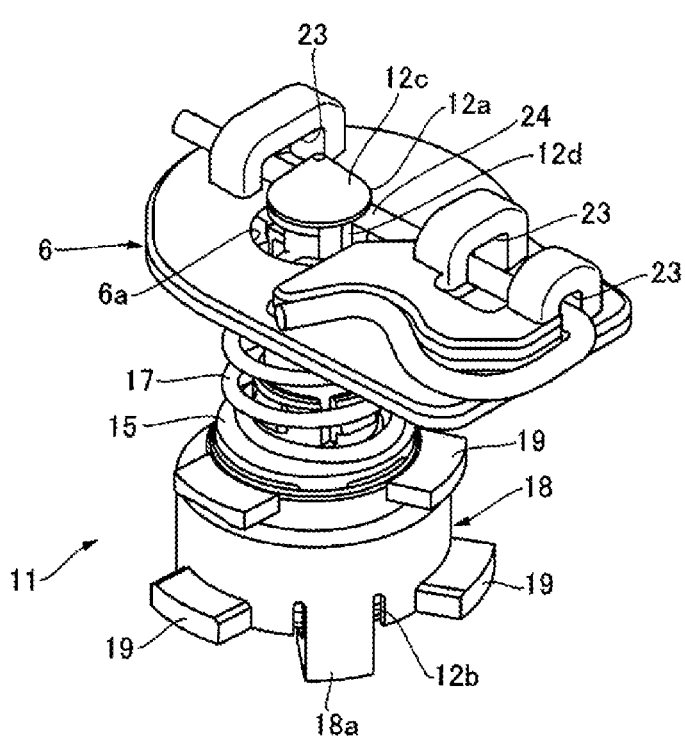
FIG. 4 is a perspective view illustrating a state in which the damper as illustrated in FIG. 3 is connected to the module housing.
Figure 5:
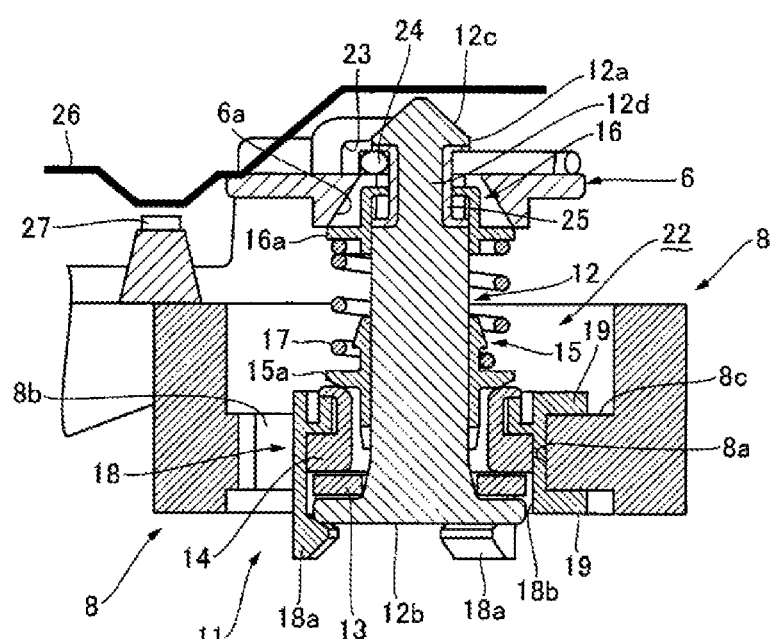
FIG. 5 is a cross-sectional view illustrating a state in which the damper as illustrated in FIG. 3 is secured to the steering wheel and connected to the module housing.

Briefly describing the damper 11 as illustrated in FIG. 3 to FIG. 5 (in the drawings, the module housing 6 is only partially depicted), the damper 11 is made up of a straight shaft-shaped pin 12 that has a connecting tip end part 12*a* and a base plate part 12*b* on both ends, a circular insulator 13 encircling the pin 12 and superimposed on the base plate part 12*b*, a circular rubber 14 encircling the pin 12 and superimposed on the circular insulator 13, a cylindrical insulator 15 with a first spring seat 15*a* that is superimposed on the rubber 14, provided encircling the pin 12, a collar 16 with a second spring seat 16*a*, formed in a circular shape encircling the pin 12, provided freely slidable in the axial direction of the pin 12 on the connecting tip end part 12*a* side and abuts the back side of the module housing 6, a coil-shaped horn spring 17 provided encircling the pin 12 between the first spring seat 15*a* and second spring seat 16*a* elastically supporting the module housing 6 via the collar 16, a holder 18 formed in a cylindrical shape encircling the rubber 14 provided on the base plate part 12*b* side of the pin 12 that supports the rubber 14 on the pin 12, and grips 19 projecting in a pair facing both ends in the length direction (axial direction of the pin 12) of the holder 18 at intervals in the circumferential direction of the holder 18.

The component parts of the damper 11 are made of a synthetic resin molded product except for the metal horn spring 17 and the rubber 14. The damper 11 is a substantially cylindrical unit component in which the pin 12 to the grip 19 are integrally assembled so as to simplify the mounting workability to the steering wheel 1 and the connection workability to the airbag module 3.

A plurality of hooking parts 18*a* are formed on the holder 18 in a cylindrical shape. These hooking parts 18*a* support the base plate part 12*b* from the side opposite of the horn spring 17 side.

During assembly of the damper 11, the holder 18 is attached after assembling up to the collar 16 on to the pin 12, and then assembling at least the circular insulator 13, the rubber 14, and the cylindrical insulator 15. For this reason, as illustrated in FIG. 5, an opening 18*b* is formed in the holder 18 on the base plate part 12*b* side in order to insert the assembled portion, and the hooking part 18*a* is formed so as to be elastically deformable.

The connecting tip end part 12*a* of the pin 12 is inserted through the opening 18*b* of the holder 18, and finally, the base plate part 12*b* expands the hooking part 18*a* and is pushed into the holder 18, and the pin 12 is engaged and supported by the elastically restored hooking part 18*b* [sic].

By supporting the base plate part 12*b*, the hooking part 18*a* supports the elastic force of the horn spring 17 acting from the first spring seat 15*a* of the cylindrical insulator 15 via the rubber 14 and the circular insulator 13.

The tip 12*c* of the connecting tip end part 12*a* is formed in a cone shape. After the horn spring 17 is provided on the pin 12, the collar 16 is pushed into the pin 12 through the cone-shaped tip 12*c* and mated so that the collar 16 cannot be pulled out.

As a result, a prescribed set load is introduced into the horn spring 17 by the first and second spring seats 15*a* and 16*a*.

As such, the holder 18 having the hooking part 18*a* and the collar 16 constitute a damper 11 that is integrally assembled and unitized.

A vibration insulating member is preferably provided between the hooking part 18*a* and the base plate part 12*b* so that abnormal noise or undesired vibration does not occur in the pin 12.

A non-woven fabric or the like can be used as the vibration insulating member, for example. This non-woven fabric may be provided by being sandwiched between the hooking part 18*a* and the base plate part 12*b* to which the hooking part 18*a* abuts.

Figure 7:
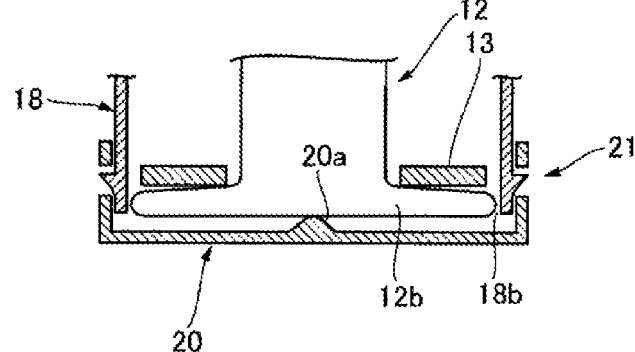
FIG. 7 is a cross-sectional view illustrating a state in which the damper as illustrated in FIG. 3 is attached with a cover instead of a hooking part.

As illustrated in FIG. 7, in place of the hooking part 18*a*, the holder 18 may be provided with a cover 20 facing the base plate part 12*b* of the pin 12 as a separate part.

In this case, after the base plate part 12*b* is stowed in the holder 18, the opening 18*b* is closed using a cover 20 by uneven fitting 21 or the like. The base plate part 12*b* is supported by the cover 20 that blocks the opening 18*b*.

The cover 20 is preferably formed with a convex portion 20*a* that is in contact with the base plate part 12*b* and allows the pin 12 to oscillate. By supporting the pin 12 in a manner allowing oscillation with the convex portion 20*a*, the flexibility when connecting the connecting tip end part 12*a* to the module housing 6 is improved.

In the case of the cover 20, the vibration insulating member may be provided so as to be sandwiched between the cover 20 and the base plate part 12*b* facing the cover 20.

The cylindrical insulator 15 surrounding the pin 12 is in point contact with the pin 12 or in line contact with the pin 12 in the axial direction. Although not illustrated, specifically, on the inner surface of the cylindrical insulator 15, point protrusions and linear protrusions for abutting on the outer surface of the pin 12 are formed. As a result, the damping frequency of the damper 11 is finely adjusted.

The circular insulator 13 is provided so as to be in close contact with the rubber 14 in the axial direction of the pin 12. As a result, the circular insulator 13 superimposed between the base plate part 12*b* and the rubber 14 causes the rubber 14 to exhibit the damping performance as set regardless of the mounting accuracy of the holder 18 and the pin 12.

The holder 18 has a grip 19 on the base plate part 12*b* side of the pin 12, which is one end portion of the damper 11. The grip 19 is engaged to the central cored bar 8 by a rotation operation around the axis of the pin 12 (see arrow r in FIG. 2), whereby the damper 11 is secured to the steering wheel 1.

A mounting hole 8*a* into which the holder 18 is inserted is formed through the central cored bar 8. The mounting hole 8*a* is formed with a notch 8*b* through which one of the grips 19 protruding from the holder 18 in pairs is inserted. To engage the grip 19 to the central cored bar 8, the grip 19 is positioned at the notch 8*b*, and the holder 18 is rotated by several tens of degrees. Based on the rotation operation, the grip 19 is rotated and moved from the notch 8*b* position. The pair of grips 19 move from the notch 8*b* position, and grip the central cored bar 8 by sandwiching it from both the front and back surfaces. As a result, the damper 11 is secured to the central cored bar 8.

The damper 11 secured to the central cored bar 8 is in a state in which the connecting tip end part 12*a* protrudes from the steering wheel 1 side toward the airbag module 3 side.

In the present Embodiment, in order to improve the assemble-ability of the damper 11, the holder 18 and the grip 19 are integrally formed by resin molding or the like. However, the holder 18 and the grip 19 may be separate parts.

Instead of engaging by the combination of the notch 8*b* and the grip 19, screw mating may be used. The notch 8*b* may be used as the female thread of the mounting hole 8*a*, and the grip 19 may be used as the male thread of the holder 18 so as to be engaged by the rotation operation of screw fitting.

As illustrated in FIG. 5, in the central cored bar 8, at least the engaged region 8*c* to which the grip 19 of the damper 11 is engaged is formed to be thinner than the other peripheral regions. As a result, the central cored bar 8 is provided with a damper installation recess 22 that houses substantially the entire damper 11.

As a result, the installation space for the damper 11 can be secured by utilizing the thickness of the central cored bar 8. If the installation space of the damper 11 is secured, the amount of protrusion of the damper 11 from the steering wheel 1 is adjusted, and the degree of freedom in the mounting design of the airbag module 3 is increased.

The connecting tip end part 12*a* of the pin 12, which is the other end of the damper 11, is connected to the module housing 6. The connecting tip end part 12*a* of each damper 11 is inserted into a plurality of insertion holes 6*a* formed through the module housing 6, respectively.

The insertion holes 6*a* are arranged and formed so as to encircle the outer edge of the inflator 7 (see FIG. 9). These insertion holes 6*a* are preferably arranged so as to be close to, preferably very close to, the outer edge of the inflator 7.

Three insertion holes 6*a* are formed corresponding to the number of dampers, which is three dampers 11. Further, the insertion hole 6*a* is arranged so as to face the mounting hole 8*a* of the central cored bar 8.

A constricted portion 12*d* is formed on the connecting tip end part 12*a* of the pin 12 so as to reduce the diameter. The outer diameter of the constricted portion 12*d* is smaller than the hole diameter of the insertion hole 6*a*.

An engaging groove 23 is formed in the module housing 6 of the airbag module 3 by indenting and raising the back surface side toward the front surface side.

A rod-shaped set spring 24 formed of a metal wire rod is engaged in the engaging groove 23 so as to be supported by the module housing 6. In the illustrated example, the rod-shaped set spring 24 uses an omega spring having a bent portion that abuts on the surface side of the module housing 6 so as not to fall off from the engaging groove 23.

Figures 6A, 6B, 6C:
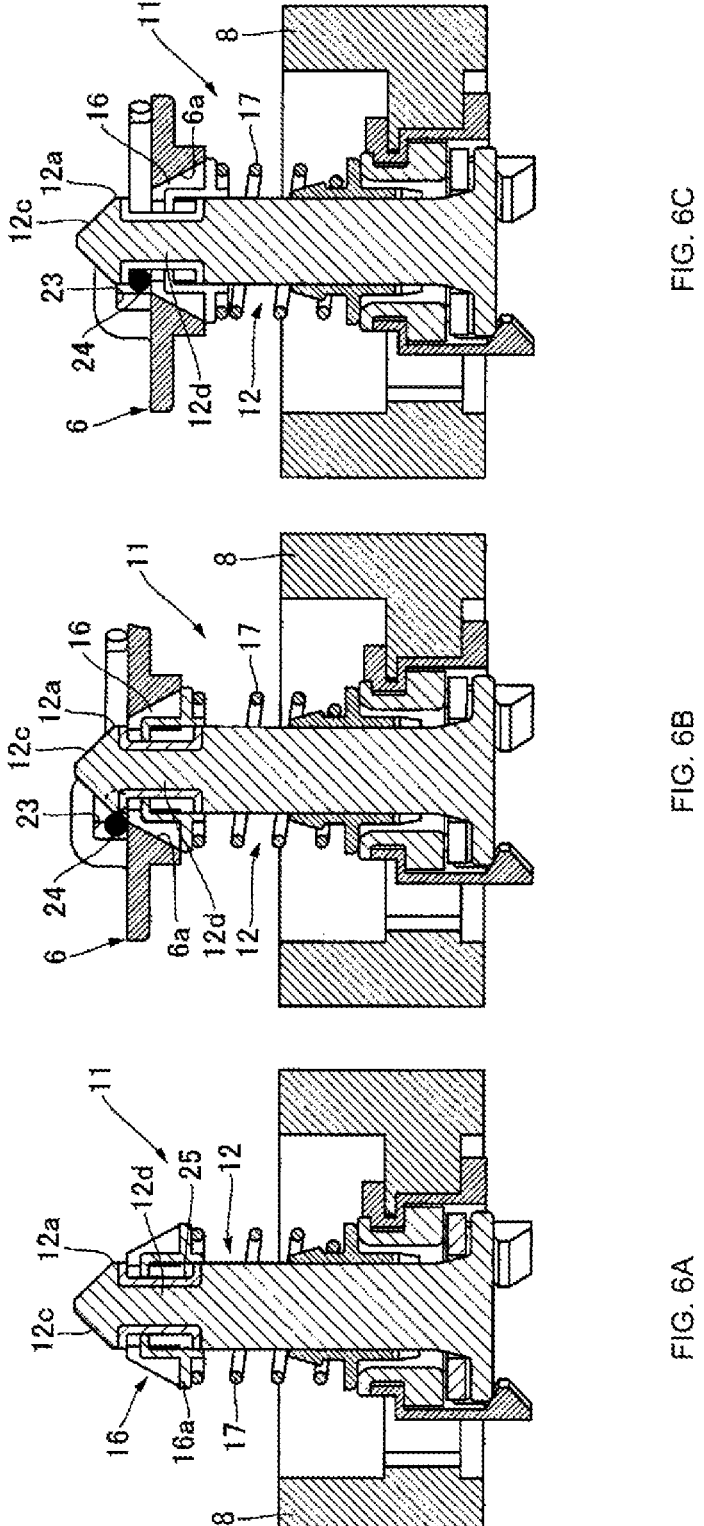
FIG. 6(A) illustrates a state prior to the module housing covering the connecting tip end part.
FIG. 6(B) illustrates a state in which the set spring is elastically deformed by the connecting tip end part.
FIG. 6(C) illustrates a state in which the set spring is engaged with the connecting tip end part.

The set spring 24, which is engaged in the engaging groove 23 and supported on the module housing 6, is arranged so as to cross the insertion hole 6*a*. As illustrated in FIGS. 6(A) to 6(C), the set spring 24 is elastically deformed and engaged with the constricted portion 12*d* of the connecting tip end part 12*a* which is inserted and goes into the insertion hole 6*a*. As a result, the connecting tip end part 12*a*, that is, the damper 11, is connected to the module housing 6, that is, the airbag module 3.

In actual assembly, the insertion hole 6*a* on the airbag module 3 side is mated toward the connecting tip end part 12*a* of the damper 11 secured to the steering wheel 1. On the contrary, inserting the connecting tip end part 12*a* into the insertion hole 6*a* is of course possible.

The connecting tip end part 12*a* and the set spring 24 are positioned in the vibration transmission path from the steering wheel 1 to the airbag module 3. Therefore, the connecting tip end part 12*a* and the set spring 24 may be damaged such as by rubbing against each other when vibration occurs.

Therefore, the constricted portion 12*d* of the pin 12 is preferably provided with a cover part to avoid contact with the set spring 24.

In the illustrated example, as illustrated in FIG. 3 and FIG. 5, a wear-resistant resin ring 25 is attached to the constricted portion 12*d* as a separate component. Of course, a covering layer similar to that of the ring may be formed on the constricted portion 12*d* by overmolding. Further, although not illustrated, the set spring 24 may be provided with a wear-resistant cover part to avoid contact with the pin 12.

The module housing 6 is elastically supported from the steering wheel 1 side by a horn spring 17 incorporated in damper 1. As illustrated in FIG. 5, a horn plate 26 is provided on the module housing 6 side.

The horn plate 26 is provided at a position avoiding the damper 11 so as not to interfere with the damper 11. A horn contact 27 is provided on the central cored bar 8 side so as to face the horn plate 26. The horn contact 27 makes the horn sound when coming into contact with the horn plate 26.

When the horn pad portion 4 is pressed, the horn spring 17 is shortened. As a result, the horn plate 26 on the airbag module 3 side approaches the central cored bar 8 and comes into contact with the horn contact 27, whereby the horn sounds.

When the pressure of the horn pad portion 4 is released, the horn spring 17 lengthens and is restored. As a result, the horn plate 26 is separated from the horn contact 27, and the sounding of the horn stops.

By incorporating the horn spring 17 into the damper 11, a horn mechanism is provided in the steering wheel 1 in a space-saving manner.

Next, operation of the vehicle steering wheel device according to the present Embodiment will be described. In the steering wheel 1 illustrated in FIG. 1, a state where the damper 11 is attached to the central cored bar 8 is illustrated on the left side where the damper 11 is broken apart, and the state where the damper 11 is connected to the module housing 6 is illustrated on the right side where the damper 11 is broken apart. FIG. 2 illustrates a state in which the three dampers 11 are attached to the central cored bar 8.

As illustrated in FIG. 1 to FIG. 6, the damper 11 as a unit component is assembled in advance.

The grip 19 is aligned with the notch 8*b* in each of the mounting holes 8*a* formed in the central cored bar 8 of the steering wheel 1, and the holder 18 of each damper 11 is inserted.

Next, the damper 11 is rotated around the axis of the pin 12 and engaged so as to sandwich the central cored bar 8 with the grip 19. As a result, the damper 11 is secured to the central cored bar 8. This assembly work completes the attachment of the plurality of dampers 11 to the steering wheel 1.

On the other hand, for the module housing 6 of the airbag module 3, the rod-shaped set spring 24 is engaged in each of the engaging grooves 23.

The set spring 24 is arranged so as to cross the insertion hole 6*a*. The connecting tip end part 12*a* of the pin 12 of each damper 11 is inserted into each insertion hole 6*a*.

As illustrated in FIG. 6(A), the connecting tip end part 12*a* having the tip 12*c* formed in a cone shape elastically deforms and pushes the set spring 24 crossing the insertion hole 6*a* when covered by the module housing 6 and is inserted into the insertion hole 6*a*, as illustrated in FIG. 6(B). When the tip 12*c* passes through the set spring 24, as illustrated in FIG. 6(C), the set spring 24 is elastically restored and the tip enters and engages with the constricted portion 12*d* inserted into the insertion hole 6*a* following the tip 12*c*.

As a result, each damper 11 is connected to the module housing 6. Based on this assembly work, the connection of the plurality of dampers 11 to the airbag module 3 is completed. With the connection work, the horn spring 17 is compressed with a prescribed stroke according to the mounting of the horn pad portion 4.

Following the first step of attaching the three dampers 11 to the steering wheel 1, the second step of pressing the horn pad portion 4 toward the central cored bar 8 is performed. Following these two steps enables completion of the vehicle steering wheel device according to the present Embodiment. At the time of completion, the horn plate 26 is arranged so as to face the horn contact 27 on the steering wheel 1 side.

The completed vehicle steering wheel device is equipped with a function as a front airbag, a function as a horn, and a vibration damping function that exhibits a damping effect comparable to that of the conventional one.

In the vehicle steering wheel device according to the present Embodiment, if the module housing 6 is provided with an inflator 7 facing the central cored bar 8, a structure is provided such that:

(1) each damper 11 has a straight pin 12, (2) the pin 12 is engaged by rotational operation of the axial circumference of the pin 12 to the central cored bar 8 and is provided with a grip 19 for securing the damper 11 on the first end thereof, and a connecting tip end part 12*a* for connecting with the module housing 6 is provided on the second end thereof, (3) the module housing 6 is arranged with a plurality of insertion holes 6*a* encircling the outer edge of the inflator 7 into which the connecting tip end parts 12*a* are inserted, (4) the connecting tip end part 12*a* is provided with a constricted portion 12*d* with a smaller outer diameter than the hole diameter of the insertion hole 6*a*, and (5) the connecting tip end part 12*a* is connected to the module housing 6 via a rod-shaped set spring 24 supported by the module housing 6 that crosses the insertion hole 6*a* to engage with the constricted portion 12*d*. With this configuration, the airbag module 3 can be miniaturized, and the horn pad portion 4 can also be miniaturized.

The insertion holes 6*a* are arranged so as to be close to, preferably very close to, the outer edge of the inflator 7. Therefore, this is desirable in order to miniaturize the airbag module 3 and the horn pad portion 4 sufficiently.

In explaining with reference to FIG. 2, as described above, based on (1) securing the grip 19 to the steering wheel 1 with the damper 11, (2) connecting the damper 11 to the airbag module 6 [sic] with the pin 12, and (3) performing said connecting by engaging the rod-shaped set spring 24 that crosses the insertion hole 6*a* with the constricted portion 12*d*, the size of the airbag module 3 upon assembly was able to be suppressed to the size surrounded by the two-dot dashed line for the vehicle steering wheel device of the present Embodiment.

On the other hand, with the dampers 11 in the same arrangement, assuming that the dampers 11 are secured to the airbag module 3 with the grip 19, the size that enables surrounding all three mounting holes 8*a* including the notch 8*b*, that is, the size indicated by the two-dot dashed line, is exceeded. In this case, the airbag module 3 becomes large, and the horn pad portion 4 becomes large.

By mounting and securing the damper 11 to the steering wheel 1, the airbag module 3 can be made much smaller than the case where the damper 11 is mounted and fixed to the airbag module 3.

In the central cored bar 8, at least the engaged region 8*c* to which the grip 19 of the damper 11 is engaged is formed thinner than the other peripheral regions, and the damper installation recess 22 is provided. Therefore, the installation space of the damper 11 can be secured by utilizing the thickness of the central cored bar 8. By ensuring the installation space for the damper 11, the amount of protrusion of the damper 11 from the central cored bar 8 can be adjusted, and the degree of freedom in the mounting design of the airbag module 3 can be increased.

At least one of the pin 12 and the set spring 24 positioned in the vibration transmission path from the steering wheel 1 to the airbag module 3 is provided with a cover part for avoiding contact with the other. As a result, this enables preventing the two from rubbing against each other and causing damage.

Since the damper 11 is a unit component, the workability of attaching to the steering wheel 1 and the workability of connecting to the airbag module 3 can be simplified.

Since the grip 19 is integrally formed with the holder 18, the assemble-ability of the damper 11 can be facilitated.

The holder 18 includes a cover 20 facing the base plate part 12*b* of the pin 12, and the cover 20 is formed with a convex portion 20*a* that is in contact with the base plate part 12*b* and allows the pin 12 to oscillate. As a result, the pin 12 can be supported by the convex portion 20*a* in a manner allowing oscillation, and the flexibility when connecting the connecting tip end part 12*a* to the module housing 6 can be improved.

Since a vibration insulating member is provided between the base plate part 12*b* and the grip 19, this enables preventing abnormal noise and unwanted vibration from occurring in the pin 12.

A horn plate 26 is provided on the module housing 6 side elastically supported by the horn spring 17. A horn contact 27 that contacts the horn plate 26 and causes the horn to sound is provided on the central cored bar 8 side. Furthermore, the horn spring 17 is incorporated in the damper 11. As a result, the steering wheel 1 can be provided with a horn mechanism in a space-saving manner.

Since the cylindrical insulator 15 is in point contact with the pin 12 or in line contact with the pin 12 in the axial direction, the damping frequency of the damper 11 can be finely adjusted.

The circular insulator 13 is in close contact with the rubber 14. Therefore, the circular insulator 13 superimposed between the base plate part 12*b* and the rubber 14 can make the rubber 14 exhibit the damping performance as set regardless of the mounting accuracy of the holder 18 and the pin 12.

Figure 8:
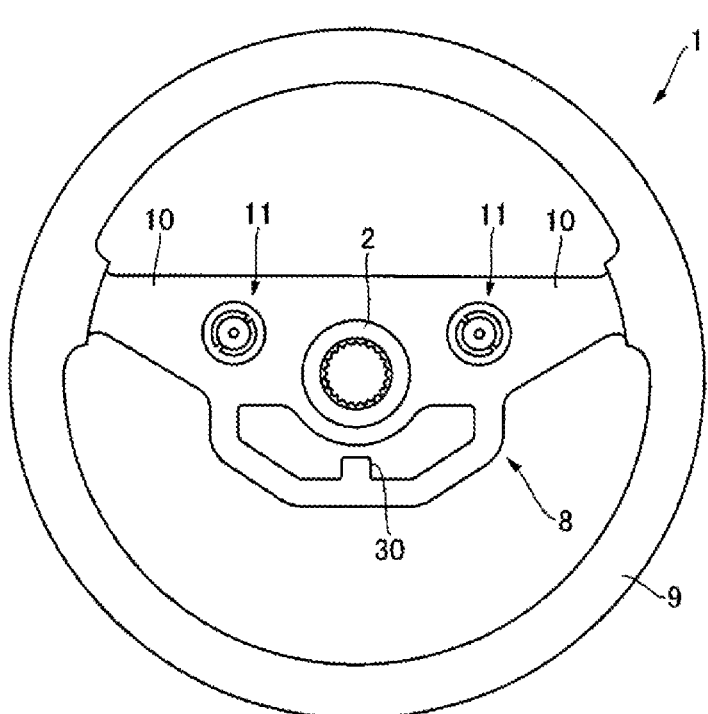
FIG. 8 is a front view of a steering wheel illustrating a modified example of the vehicle steering wheel device as illustrated in FIG. 1.
Figure 10:
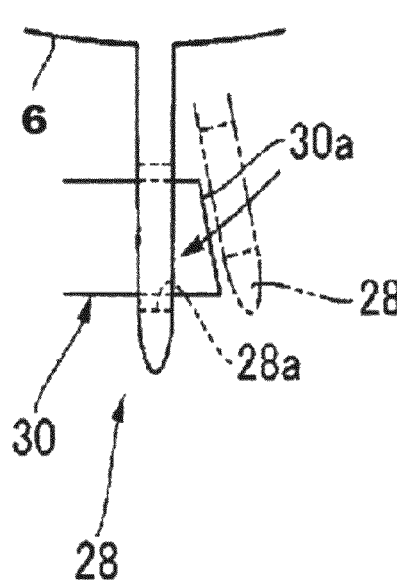
FIG. 10 is an explanatory diagram explaining the state in which the plate-shaped damper of the modified example as illustrated in FIG. 8 engages with the steering wheel.

FIG. 8 to FIG. 10 illustrate modified examples of the above Embodiment. In the above Embodiment, three dampers 11 are provided. In this modified example, two dampers 11 are arranged on both sides of the boss portion 2 in the left-right direction with reference to the neutral position of the steering wheel 1 at zero steering angle. A plate-shaped damper 28 is provided on the lower side of the steering wheel 1 in the center in the left-right direction in place of the remaining one damper 11. The plate-shaped damper 28 is provided in parallel with the damper 11 and functions as an engaging mechanism that engages the central cored bar 8 and the module housing 6 so as to be relatively displaceable.

The plate-shaped damper 28 is made of a resin-coated metal or synthetic resin and is formed as an elastically deformable plate spring.

The relative displacement specifically refers to a change in the separation distance between the steering wheel 1 and the airbag module 3 due to the vibration of the steering wheel 1 and damping by the damper 11. The engaging mechanism is adapted to tolerate this variation in distance.

Two coil springs 29 are arranged on the left and right sides of the plate-shaped damper 28. A first end of these coil springs 29 is attached to the module housing 6, and a second end is elastically in contact with the central cored bar 8 to support the periphery of the plate-shaped damper 28.

The plate-shaped damper 28 transmits vibration from the steering wheel 1 to the airbag module 3 by the elastic action thereof. The plate-shaped damper 28 cooperates with the airbag module 3 that serves as a damper mass, and dampens the vibration of the steering wheel 1 by means of the elastic action due to plate bending.

A first end of the plate-shaped damper 28 is joined to the module housing 6, and a second end is formed with an engagement opening 28*a* that is engaged with a hook 30 projecting from the central cored bar 8.

The hook 30 has a tapered surface 30*a* that guides the engagement of the engagement opening 28*a*. As the plate-shaped damper 28 gets over the tapered surface 30*a*, the engagement opening 28*a* is engaged with the hook 30.

The plate-shaped damper 28 engages the steering wheel 1 and the airbag module 3 in a relatively displaceable manner by allowing the hook 30 to move within the engagement opening 28*a*.

In the present modified example, the airbag module 3 and the steering wheel 1 are connected at three points by a plate-shaped damper 28 which is an engaging mechanism in addition to the two dampers 11.

Since the plate-shaped damper 28 is thinner and smaller than the above-mentioned cylindrical damper 11, the size of the module housing 6 required for assembly can be further reduced as compared with the Embodiment described above, and therefore, the airbag module 3 can be further miniaturized.

Of course, even in such a modified example, the same action and effect as those of the Embodiment described above can be obtained.

The vehicle steering wheel device described above is a preferred example of the present invention, and other Embodiments can also be implemented or carried out by various methods. In particular, unless otherwise described in the specification of the application, the invention is not restricted to the shapes, sizes, configurational dispositions, and the like of the parts illustrated in detail in the accompanying drawings. In addition, the expressions and terms used in the specification of the application are used for providing a description, without limiting the invention thereto, unless specifically described otherwise.

DESCRIPTION OF CODES

1. Steering wheel
2. Boss part
3. Airbag module
6. Module housing
6*a*. Insertion hole
7. Inflator
8. Central cored bar
8*c*. Engaged region
11. Damper
12. Pin
12*a*. Connecting tip end part
12*b*. Base plate part
12*d*. Constricted portion
13. Circular insulator
14. Rubber
15. Cylindrical insulator
15*a*. First spring seat
16. Collar
16*a*. Second spring seat
17 Horn spring
18. Holder
19. Grip
20. Cover
20*a*. Convex portion
22. Damper installation recess
24. Rod-shaped set spring
25. Resin ring
26. Horn plate
27. Horn contact
28. Plate-shaped damper

The invention claimed is:

1. A vehicle steering wheel device provided with a plurality of dampers that absorb vibrations of the steering wheel around a boss part of the steering wheel in between a central cored bar of the steering wheel and a module housing of an airbag module which is a damper mass, wherein:

each of the dampers has a pin, a grip provided on a first end of the pin is engaged to the central cored bar through a rotational operation around an axis of the pin, securing each damper, and a connecting tip end part provided on a second end of the pin connects to the module housing, wherein the pin is rotationally symmetric about the axis, wherein each of the dampers comprises a holder formed in a cylindrical shape and provided along a base plate part side of the pin, and wherein the holder comprises a hooking part configured to support a base plate part of the pin;

the module housing is provided with an inflator facing the central cored bar;

the module housing is provided with a plurality of insertion holes for inserting each of the connecting tip end parts arranged encircling an outer edge of the inflator;

for each damper, the connecting tip end part is formed with a constricted portion that has a smaller outer diameter than a hole diameter of each insertion hole; and for each damper, the connecting tip end part is connected with the module housing via a set spring supported by the module housing such that the set spring engages with the constricted portion.

2. The vehicle steering wheel device according to claim 1, wherein each of the plurality of insertion holes is arranged so as to be adjacent to the outer edge of the inflator.

3. The vehicle steering wheel device according to claim 1, wherein two dampers of the plurality of dampers are disposed on both sides in a left-right direction of the boss part, with reference to a neutral position of the steering wheel having a steering angle of zero, and is provided with an engagement mechanism that allows relative displacement between the central cored bar and the module housing in parallel with at least one damper of the plurality of dampers.

4. The vehicle steering wheel device according to claim 1, wherein the central cored bar comprises a damper installation recess having an engaged region configured to engage the grip of one of the plurality of dampers, and wherein the central cored bar is formed thinner along the engaged region than other peripheral regions of the central cored bar.

5. The vehicle steering wheel device according to claim 1, wherein, for each damper, the pin is provided with a cover part for avoiding contact with the set spring.

6. The vehicle steering wheel device according to claim 1, wherein each damper comprises:

the pin forming the connecting tip end part on the second end and the base plate part on the first end;

a circular insulator encircling the pin and superimposed on the base plate part;

a circular rubber encircling the pin and superimposed on the circular insulator;

a cylindrical insulator having a first spring seat superimposed on the circular rubber provided encircling the pin;

a collar having a second spring seat, formed in a circle encircling the pin, and provided freely slidable in an axial direction of the pin on a connecting tip end part side and enabling contact with the module housing;

a horn spring provided encircling the pin between the first and second spring seats, and that elastically supports the module housing via the collar;

wherein the holder encircles the circular rubber to retain the circular rubber on the pin, and the grip is configured to be provided on the holder, and wherein each damper is a unit part integrally assembled from the pin to the grip.

7. The vehicle steering wheel device according to claim 6, wherein, for each damper, the grip is integrally formed with the holder.

8. The vehicle steering wheel device according to claim 6, wherein a horn plate is provided on a module housing side elastically supported by at least one of the horn springs, and a horn contact is provided on a central cored bar side in contact with the horn plate to sound a horn.

9. The vehicle steering wheel device according to claim 6, wherein, for each damper, the cylindrical insulator is in line contact with the pin in the axial direction of the pin.

10. The vehicle steering wheel device according to claim 6, wherein, for each damper, the circular insulator is brought in close contact with the circular rubber.

11. The vehicle steering wheel device according to claim 1, wherein, for each damper, the set spring is caused to cross one of the plurality of insertion holes and is supported by the module housing.

12. The vehicle steering wheel device according to claim 1, wherein, for each damper, the set spring is formed of a rod-shaped metal member.

\* \* \* \* \*